(12) United States Patent
Meverden et al.

(10) Patent No.: US 7,662,901 B2
(45) Date of Patent: Feb. 16, 2010

(54) HIGH CRYSTALLINITY, HIGH MELT FLOW RATE POLYPROPYLENE

(75) Inventors: Craig C. Meverden, Wexford, PA (US); Sehyun Kim, Deer Park, IL (US)

(73) Assignee: Sunoco Chemicals, Inc., Philadelphia, PA (US)

( * ) Notice: Subject to any disclaimer, the term of this patent is extended or adjusted under 35 U.S.C. 154(b) by 76 days.

(21) Appl. No.: 11/998,583

(22) Filed: Nov. 30, 2007

(65) Prior Publication Data

US 2009/0143539 A1 Jun. 4, 2009

(51) Int. Cl.
*C08F 110/06* (2006.01)
*C08F 4/42* (2006.01)

(52) U.S. Cl. .............. 526/351; 526/142; 526/125.3; 526/124.3; 526/158

(58) Field of Classification Search .............. 526/351, 526/142, 125.3, 124.3, 158
See application file for complete search history.

(56) References Cited

U.S. PATENT DOCUMENTS

| 4,522,994 | A | 6/1985 | Chiba et al. |
| 5,141,994 | A | 8/1992 | Kakugo et al. |
| 5,308,908 | A | 5/1994 | Fukui et al. |
| 5,414,027 | A | 5/1995 | DeNicola, Jr. et al. |
| 6,323,150 | B1 | 11/2001 | Kojoh et al. |
| 6,635,734 | B2 | 10/2003 | Shamshoum et al. |
| 6,657,025 | B2 * | 12/2003 | Blackmon et al. ........... 526/142 |
| 7,022,796 | B2 | 4/2006 | Blackmon et al. |
| 2007/0287813 | A1 | 12/2007 | Meverden et al. |

FOREIGN PATENT DOCUMENTS

| JP | 01-104639 A | 4/1989 |
| JP | 04-202507 A | 7/1992 |
| WO | WO93/09150 A | 5/1993 |

* cited by examiner

*Primary Examiner*—Ling-Siu Choi
(74) *Attorney, Agent, or Firm*—Duane Morris LLP

(57) ABSTRACT

The present invention is directed to a high melt flow rate high crystallinity polypropylene homopolymer. The present invention likewise describes a bulk polymerization process using a Ziegler-Natta catalyst to produce the high melt flow rate high crystallinity polypropylene homopolymer according to the invention.

12 Claims, No Drawings

HIGH CRYSTALLINITY, HIGH MELT FLOW RATE POLYPROPYLENE

FIELD OF THE INVENTION

The present invention relates to reactor grade high melt flow, high crystalline polypropylene homopolymers and methods for making the same.

BACKGROUND OF THE INVENTION

Liquid phase polymerization processes can be grouped into two general types: bulk processes and slurry processes. Both the bulk process and the slurry process are described by Ser van der Ven in "Polypropylene and Other Polyolefins", © 1990, Elsevier Science Publishing Company, Inc., pp. 119-125. Both the slurry process and the bulk process are described as operating with a suspension of growing polymer particles in a liquid. In the case of the slurry process, the liquid is an inert solvent, such as hexane. In the case of the bulk process it is liquid monomer.

U.S. Pat. No. 4,522,994 to Chiba, et al, describes highly crystalline, high melt flow rate polypropylene produced using a Ziegler-Natta (ZN) catalyst in a slurry process. In order, however, to isolate the desired highly crystalline, high melt flow rate polymer, Chiba was obliged to extract significant amounts of soluble polymer produced during the polymerization reaction. Thus, although Chiba's insoluble polymer is highly crystalline, the process described in 4,522,994 does not control the quantity of soluble polymer produced. This lack of control results in reduced yields of the desired product and significant waste.

Another means of achieving a high melt flow rate in a polymer is through post polymerization treatment with a vis-breaking agent to reduce the average molecular weight of the polymer. This method, however, necessitates an additional process step and negatively affects the molecular weight distribution (Mw/Mn) of the polymer. Vis-breaking also creates additional xylene soluble material, which negatively affects the properties of the desired material.

U.S. Pat. No. 6,323,150 to Kojoh, et al, describes ZN catalysts employing a combination of two internal donors selected from a polycarboxylic acid compound and a polyether. The catalysts described in U.S. Pat. No. 6,323,150 are described as being capable of producing olefin polymers of high stereoregularity. All of the examples provided in U.S. Pat. No. 6,323,150, however, describe polymers produced using a slurry process.

SUMMARY OF THE INVENTION

The present invention provides a propylene homopolymer produced in a bulk polymerization process in the presence of a Ziegler-Natta catalyst comprising a first internal donor, a second internal donor, and an external donor, wherein the first internal donor is a phthalate and the second internal donor is one of a diether or a succinate, further wherein the external donor is selected from the group consisting of cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes.

The propylene homopolymer has a xylene soluble content of less than 2 percent. In preferred embodiments, the xylene soluble content is less than 1.5 percent. The homopolymer likewise has a xylene insoluble fraction having a meso pentad content of greater than 96 percent. In preferred embodiments, the xylene insoluble fraction has a meso pentad content of greater than 97 percent. The Nm of the xylene insoluble fraction of the homopolymer is at least about 140. In preferred embodiments, the Nm of the xylene insoluble fraction is at least 160. In more preferred embodiments, the Nm of the xylene insoluble fraction is at least 170. The propylene homopolymer has a melt flow of greater than or equal to 20 dg/min but less than 60 dg/min.

The present invention also includes a process for making the polypropylene homopolymer described herein.

DESCRIPTION OF THE INVENTION

The present invention provides a bulk liquid process for producing highly crystalline, high melt flow polypropylene homopolymers with low xylene solubles.

In an embodiment of the bulk liquid process, the polypropylene homopolymers are produced using a Zeigler-Natta (ZN) catalyst system comprising titanium, a first and a second internal electron donor, and an external electron donor.

Preferably, the first internal donor is a phthalate and the second internal donor is a succinate or a diether. The ratio of the first internal donor to the second internal donor is about 5:95 to about 95:5 by weight. More preferably, the ratio is about 15:85 to about 85:15 by weight. Even more preferably, the ratio of the first internal donor the second internal donor is about 30:70 to about 70:30 by weight.

Examples of external donors that enable the ZN catalyst to produce highly crystalline, high melt flow rate polypropylene homopolymers with low xylene solubles according to the invention include:

cyclohexylmethyldimethoxysilane ("CMDS"), cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes such as $(R_2N)_2Si(OCH_3)_2$, $(R_2N)_2Si(OCH_2CH_3)_2$ and $(piperidinyl)_2Si(OCH_3)_2$.

The preferred molar ratio of the external donor to titanium in the ZN catalyst is about 25 to about 40. More preferably, the molar ratio of external donor to titanium in the ZN catalyst is about 29 to about 35. Most preferably the molar ratio of external donor to titanium in the ZN catalyst is about 32.

In preferred embodiments of the bulk liquid process, the hydrogen concentration in the reactor is preferably about 1500 ppm to about 4400 ppm. More preferably, the hydrogen concentration in the reactor is about 2000 ppm to about 3500 ppm. Even more preferably, the hydrogen concentration in the reactor is about 2500 ppm to about 3200 ppm. Most preferably, the hydrogen concentration in the reactor is about 3100 ppm.

As the hydrogen concentration is reduced, the melt flow rate of the homopolymer according to the invention is reduced. Likewise, as the hydrogen concentration is increased, the melt flow rate of the homopolymer polypropylene of the invention increases. In all cases, the reactor is preferably maintained at about 70° C. to about 75° C.

The present invention further provides the highly crystalline, high melt flow rate polypropylene homopolymer with low xylene solubles produced according to the process described herein.

The homopolymer according to the present invention has a melt flow rate of greater than or equal to 20 dg/min but less than 60 dg/min, as measured using test method ASTM-D1238. Preferred melt flows of the homopolymer of the present invention include 20, 25, 30, 35, 40 and 55 dg/min.

The xylene solubles content of the homopolymer according to the invention is less than 2 percent as measured using test method ASTM-D5492. In preferred embodiments, the content of xylene solubles as measured by ASTM-D5492 is less than 1.5 percent. In more preferred embodiments, the content of xylene solubles as measured by ASTM-D5492 is less than 1.3 percent.

The meso pentad (mmmm) content in the xylene insoluble portion of the homopolymer according to the current invention is at least 96 percent as measured by $^{13}$C NMR. In preferred embodiments, the meso pentad content in the xylene insoluble fraction is at least 97 percent as measured by $^{13}$C NMR.

The average meso run length (Nm) in the xylene insoluble portion of the homopolymer is at least 140. The meso run length is also determined by $^{13}$C NMR spectra and is calculated according to the formula Nm=2(mm/mr)+1. In preferred embodiments, the average meso run length is at least 160. In more preferred embodiments, the average meso run length is at least 170.

The overall crystallinity of the homopolymer according to the current invention was measured using differential scanning calorimetry (DSC). Preferably, the percent crystallinity according to DSC is at least about 58%. More preferably, the percent crystallinity is at least about 60%. Most preferably, the percent crystallinity is at least about 62%. DSC values are based on a total heat of fusion value of 165 Joules/gram for 100% crystalline polypropylene according to B. Wunderlich, Macromolecular Physics, Volume 3, Crystal Melting, Academic Press, New York, 1980, pg. 63.

When formulated with a nucleator, the polypropylene homopolymers according to the current invention preferably exhibit a flexural modulus of greater than about 285,000 psi. More preferably the flexural modulus is greater than about 290,000 psi. Even more preferably, the flexural modulus is greater than about 292,000 psi. The tensile yield stress of the nucleated homopolymer is preferably above 5,800 psi.

The homopolymer of the present invention is a good base material for compounding with rubber, fillers and other additives (nucleators, etc). The homopolymer according to the current invention is also capable of being carried forward into a subsequent reactor for a subsequent polymerization step to produce copolymers with a comonomer selected from the group consisting of $C_2$-$C_6$ alkenes other than propylene.

EXAMPLES

A representative example of a polypropylene homopolymer according to the present invention was prepared according to the bulk liquid polymerization process described herein. The process utilized a Zeigler-Natta catalyst employing a phthalate as the first internal donor and a diether as the second internal donor. The external donor was CMDS.

Two comparative homopolymer polypropylene examples were also prepared in a bulk liquid process. In comparative example 1, a ZN catalyst employing a single internal donor (phthalate) was used in combination with CMDS as an external donor. In comparative example 2, the Ziegler-Natta catalyst employed a single internal donor (phthalate) and dicyclopentyldimethoxysilane ("DCPMS") as the external donor.

The conditions for each the above described exemplary polymerizations and the properties of the resulting polymer powders are shown in Tables 1 and 2, respectively.

TABLE 1

|  | Invention | Comp. Ex. 1 | Comp. Ex. 2 |
| --- | --- | --- | --- |
| Internal Donor(s) | phthalate/diether | phthalate | phthalate |
| External Donor | CMDS | CMDS | DCPMS |
| Temp. (° C.) | 73 | 73 | 75 |
| Si/Ti (mol/mol) | 32 | 41 | 27-32 |
| $H_2$ (ppm) | 3100 | 2800-3000 | 4600 |
| Yield (gPP/gCat) | 39,900 | 24,600 | 47,000-49,000 |

Si/Ti = the molar ratio of external donor (Si) to titanium (Ti) in the catalyst
$H_2$ ppm = the concentration of $H_2$ charged to the reactor

TABLE 2

|  | Invention | Comp. Ex. 1 | Comp. Ex. 2 |
| --- | --- | --- | --- |
| MFR (dg/min.) | 37 | 35 | 34 |
| % XS | 1.24 | 1.55 | 1.24-1.60 |
| % mmmm (XI fraction) | 97.12 | 96.20 | 97.13-97.54 |
| Nm (XI fraction) | 176 | 122 | 165-205 |
| $T_m$ (DSC) | 162.8 | 162.1 | — |
| $T_c$ (DSC) | 113.3 | 113.2 | — |
| % xtall (DSC) | 62.1 | 62.2 | — |

XI = xylene insoluble
% xtall = the weight percent of crystalline polymer as measured by DSC (Heat of Fusion).
— = no data available Comparative example 1 demonstrates that although a high melt flow rate polymer can be prepared with a ZN catalyst employing a phthalate internal donor and CMDS external donor, the mmmm and Nm of the polymer are lower than for the representative invention example. Comparative example 1 likewise highlights the enhanced activity of the phthalate/diether dual internal donor system as the yield of the invention polymer was substantially higher than yield for the system using only a phthalate internal donor.

Comparative Example 2 demonstrates that the use of DCPMS requires nearly 50% more hydrogen than a process using CMDS and a phthalate/diether dual internal donor system.

The ability of the invention process to use less hydrogen has several distinct advantages, including reduced expense as, comparatively, less hydrogen must be produced or purchased. Likewise, less hydrogen makes recovery and purification of the bulk phase propylene monomer easier and more cost effective. Less hydrogen is also safer as it allows the process to be run at a comparatively lower pressure than the DCPMS process.

The use of less hydrogen is beneficial in other respects as well. As is well appreciated, hydrogen levels in copolymerization reactors may adversely affect the copolymerization reaction. By using less hydrogen, the present process allows a producer to prepare copolymers utilizing homopolymer produced according to the present process as the first component in a reactor blend impact or other copolymer.

Nucleated (pelletized) samples of the representative polymer of the invention and Comparative Example 2 were also prepared. The physical properties of these polymers are shown in Table 3.

TABLE 3

|  | Invention | Comp. Ex. 2 |
| --- | --- | --- |
| MFR | 37 | 35-38 |
| % XS | 1.44 | 1.24-1.60 |
| % mmmm (XI) | 96.99 | 97.13-97.54 |
| Nm (XI) | 159 | 165-205 |
| Tm | 164.9 | 166.2-166.6 |
| Tc | 123.3 | 124.5-125.6 |
| % xtall (DSC) | 66.4 | 67.6-70.2 |
| Flexural Modulus 1% secant (kPsi) | 292 | 284.8-305.4 |
| Tensile Stress Yield (Psi) | 5856 | 5842-5972 |

Flexural Modulus measured according to ASTM D790
Tensile Stress Yield measured according to ASTM D638
% xtall (DSC) measured as Heat of Fusion Referring to Table 3, both samples display comparable melt flow rates. The crystallinity of the materials, as measured by % mmmm and Nm shows that the material produced according to the current invention is nearly equivalent to material produced using a phthalate/DCPMS internal/external donor system.

The nucleated samples in Table 3 were also tested for Flexural Modulus and Tensile Stress Yield according the indicated methods. The data indicate that the representative material produced according to the current process displays nearly equivalent flexural modulus and tensile stress yield as compared to Comparative Example 2.

What is claimed is

1. A composition comprising: a propylene homopolymer produced in a bulk polymerization process in the presence of a Ziegler-Natta catalyst comprising a first internal donor, a second internal donor, and an external donor, wherein the first internal donor is a phthalate and the second internal donor is one of a diether or a succinate, further wherein the external donor is selected from the group consisting of cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes, the propylene homopolymer having a xylene soluble content of less than 2 percent, and a xylene insoluble fraction having a meso pentad content of greater than 96 percent and an average meso run length of at least 140, the propylene homopolymer having a melt flow rate of at least to 20 dg/min but less than 60 dg/min.

2. The composition according to claim 1, wherein the propylene homopolymer when nucleated has a flexural modulus of greater than about 285,000 psi and tensile yield stress of greater than 5,800 psi.

3. The composition according to claim 1, wherein the ratio of the first internal donor to the second internal donor is from 95:5 to 5:95 by weight.

4. A process for producing a high crystallinity, high melt flow rate propylene homopolymer comprising: polymerizing propylene in a bulk process in the presence of a Ziegler-Natta catalyst comprising a first internal donor, a second internal donor, and an external donor, wherein the first internal donor is a phthalate and the second internal donor is one of a diether or a succinate, further wherein the external donor is selected from the group consisting of cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes, to produce a propylene homopolymer having a xylene soluble content of less than 2 percent, and a xylene insoluble fraction having a meso pentad content of greater than 96 percent and an average meso run length of at least 140, the propylene homopolymer having a melt flow rate of at least 20 dg/min but less than 60 dg/min.

5. The process according to claim 4, wherein the external donor is cyclohexylmethyldimethoxysilane.

6. The process according to claim 4, wherein the ratio of the first internal donor to the second internal donor is from 95:5 to 5:95 by weight.

7. A propylene homopolymer having a xylene soluble content of less than 2 percent, a xylene insoluble fraction having a meso pentad content of greater than 96 percent and an average meso run length of at least 140, and a melt flow rate of at least 20 dg/min but less than 60 dg/min, wherein said propylene homopolymer is prepared by a process comprising polymerizing propylene in a bulk process in the presence of a Ziegler-Natta catalyst comprising a first internal donor, a second internal donor, and an external donor, wherein the first internal donor is a phthalate and the second internal donor is one of a diether or a succinate, further wherein the external donor is selected from the group consisting of cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes.

8. The propylene homopolymer according to claim 7, wherein the external donor is cyclohexylmethyldimethoxysilane.

9. The propylene homopolymer according to claim 7, wherein the ratio of the first internal donor to the second internal donor is from 95:5 to 5:95 by weight.

10. A method for producing a reactor grade copolymer comprising a high crystallinity, high melt flow rate propylene homopolymer, said method comprising: polymerizing propylene in a bulk process in a first reactor in the presence of a Ziegler-Natta catalyst comprising a first internal donor, a second internal donor, and an external donor, wherein the first internal donor is a phthalate and the second internal donor is one of a diether or a succinate, further wherein the external donor is selected from the group consisting of cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes, to produce a propylene homopolymer having a xylene soluble content of less than 2 percent, and a xylene insoluble fraction having a meso pentad content of greater than 96 percent and an average meso run length of at least 140, the propylene homopolymer having a melt flow rate of at least 20 dg/min but less than 60 dg/min, and transferring said homopolymer to a second reactor wherein a copolymerization takes place with a comonomer selected from the group consisting of $C_2$ to $C_6$ alkenes other than propylene.

11. The method according to claim 10, wherein the external donor is cyclohexylmethyldimethoxysilane.

12. A reactor grade copolymer comprising a propylene homopolymer having a xylene soluble content of less than 2 percent, a xylene insoluble fraction having a meso pentad content of greater than 96 percent and an average meso run length of at least 140, and a melt flow rate of at least 20 dg/min but less than 60 dg/min, wherein said homopolymer is prepared by a process comprising polymerizing propylene in a bulk process in the presence of a Ziegler-Natta catalyst comprising a first internal donor, a second internal donor, and an external donor, wherein the first internal donor is a phthalate and the second internal donor is one of a diether or a succinate, further wherein the external donor is selected from the group consisting of cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes.

* * * * *